United States Patent [19]
Bailey

[11] Patent Number: 5,333,910
[45] Date of Patent: Aug. 2, 1994

[54] HOSE FITTINGS WITH RING HOLDER
[75] Inventor: Mark R. Bailey, Madison, N.C.
[73] Assignee: Camco Manufacturing, Inc., Greensboro, N.C.
[21] Appl. No.: 266
[22] Filed: Jan. 4, 1993
[51] Int. Cl.⁵ .................................... F16L 33/20
[52] U.S. Cl. ....................... 285/12; 285/244; 285/344; 285/23; 285/242; 285/903
[58] Field of Search .............. 285/12, 23, 903, 321, 285/238, 344, 241, 242, 243, 244, 353, 384, 357

[56] References Cited
U.S. PATENT DOCUMENTS

| 767,893 | 8/1904 | Jewell | 285/243 |
| 1,113,080 | 10/1914 | Wilson | 285/244 |
| 2,433,930 | 1/1948 | Speer | 285/244 |
| 3,484,121 | 12/1969 | Quinton | 285/242 |
| 4,660,860 | 4/1987 | Todd | 285/903 |
| 4,688,833 | 8/1987 | Todd | 285/903 |
| 4,708,370 | 11/1987 | Todd | 285/903 |

FOREIGN PATENT DOCUMENTS

| 130894 | 12/1932 | Australia | 285/242 |
| 865885 | 2/1953 | Fed. Rep. of Germany | 285/344 |
| 784239 | 7/1935 | France | 285/242 |
| 2644223 | 9/1990 | France | 285/23 |
| 168493 | 9/1959 | Switzerland | 285/242 |
| 2048414 | 12/1980 | United Kingdom | 285/242 |

Primary Examiner—Eric K. Nicholson

[57] ABSTRACT

Fittings are provided for flexible sewage drain hoses to connect recreational vehicles to sewage facilities as may be found in public parks or other locations. The fittings include a shallow groove for storing an elastic ring, and a wider, deeper groove for placing the flexible sewer hose thereover. The ring can be quickly, easily manually dislodged from the storage groove and directed over the end of the hose where it contracts and securely holds the hose onto the fitting within the wide groove.

32 Claims, 3 Drawing Sheets

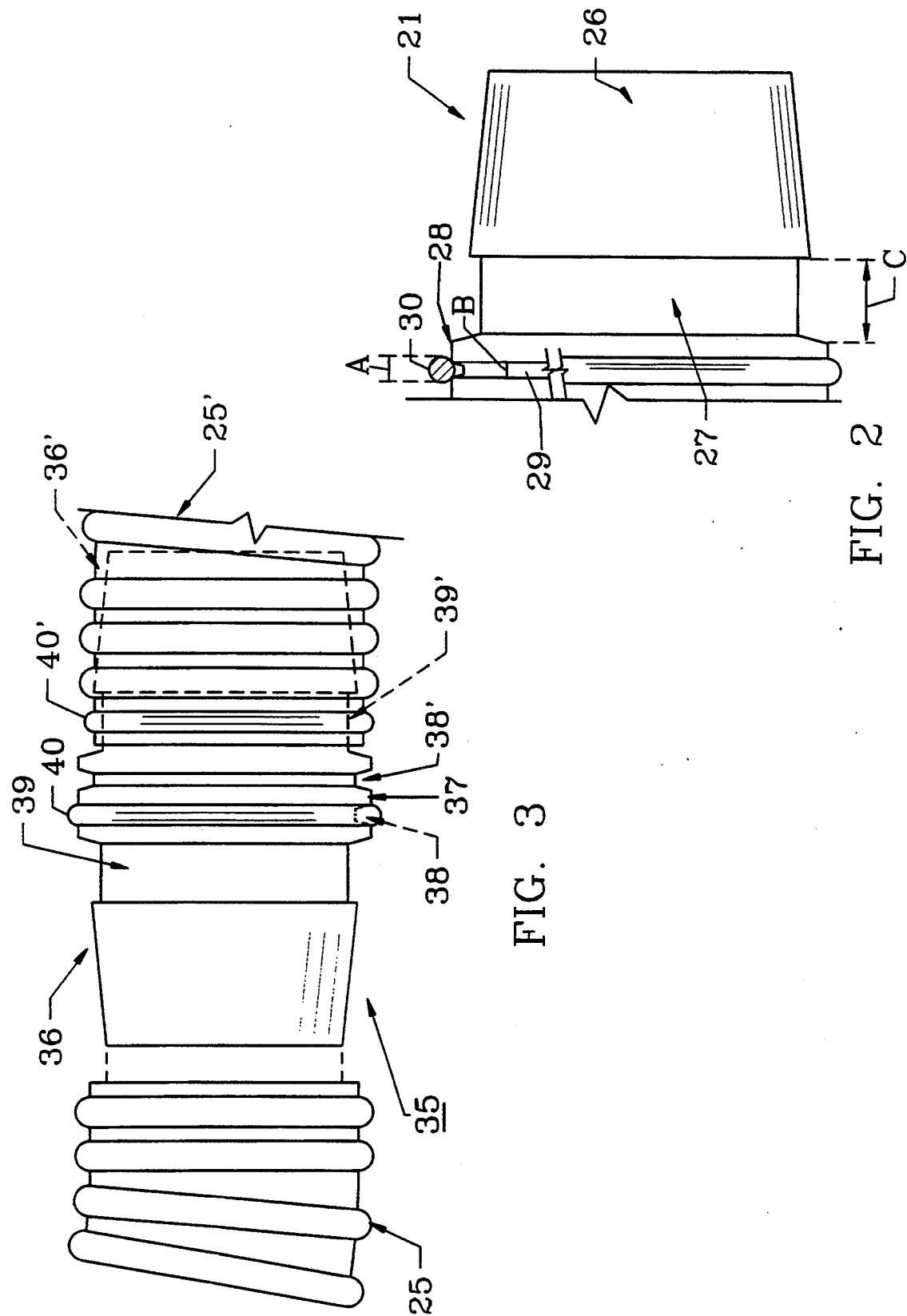

HOSE FITTINGS WITH RING HOLDER

BACKGROUND OF THE INVENTION

1. Field Of The Invention

The invention herein pertains to hose fittings and particularly to flexible sewage hose line fittings as are commonly employed with mobile homes, recreational vehicles (RV's), and campers for connection to various types of sewage treatment facilities such as in parks and campgrounds.

2. Description Of The Prior Art And Objectives Of The Invention

Recreational vehicle owners and others that have onboard bathroom plumbing must convert the plumbing to sewage treatment and/or disposal facilities at campgrounds, parks and other locations when parking for extended periods. It is conventional to use flexible plastic sewage hoses having an inside diameter of approximately three inches which may be reinforced with wire or otherwise constructed. Sewage facility stubs are generally located near the parking areas so the recreational vehicles can park nearby and by the use of a suitable length of flexible hose, easily reach and connect to the stub. With the recent growth in vehicle parks and campgrounds, stubs lack uniformity from park to park, thus requiring the RV owner to provide a fitting to match the threaded or unthreaded stub end as the case may be, to insure a tight, secure connection with the flexible sewage hose extending from the RV. In addition, a length of flexible sewage hose must oftentimes be joined to another length to obtain the desired footage, whereby a linear connector is required. Also, the sewage hose must be joined to the RV sewage tank outlet pipe, and outlet pipes vary in size, depending on the particular manufacturer and model of RV.

To accommodate the mating problems discussed above, various universal fittings have been developed in the past as have different types of tank connectors, linear fittings and the like. It is also conventional in the trade to utilize fittings having threaded ends or smooth wall ends around which tightenable metal or plastic bands can be placed and the hose thereby secured. Such metal or plastic bands often break or cannot be sufficiently tightened to insure a proper, leak proof connection, thereby causing a health hazard if sewage leaks therefrom.

With the aforesaid problems and other disadvantages associated with conventional sewage hose fittings, the present invention was conceived and one of its objectives is to provide hose fittings for use with recreational vehicles, trailers, campers, motor homes and the like allowing ease and convenience in safe, secure sewage hose hookups.

It is another objective of the present invention to provide hose fittings which employ a conical end for slidably receiving the flexible sewage hose thereover and a stretchable ring for securely holding the hose onto the fitting.

It is still another objective of the present invention to provide a hose fitting which includes a ridge having a shallow groove whereby the ring can be positioned thereon for quick removal prior to engagement with the flexible hose.

It is yet another objective of the present invention to provide a two piece hose fitting of the universal type having a reversible section which will increase its versatility.

Various other advantages and objectives of the present invention will be further explained in the detailed presentation thereof as set forth below.

SUMMARY OF THE INVENTION

The invention herein provides fittings for a recreational type vehicle sewage drain hose for easy, convenient connection and disconnection with various permanently located sewage facilities. A two-piece universal elbow--type connector is provided which allows the user to reverse a first cylindrical section to obtain the desired thread gender and size which slidably engages a second cylindrical section which includes a conically shaped end for connection with a flexible sewage hose as may be made from vinyl or the like. The second section includes a relatively wide groove which allows an elastomeric ring to tightly hold the sewage hose therein and prevents the escape of noxious fumes, liquids or the like. The same connection design can be used in a linear hose fitting, a tank connector or other fittings to provide a safe, quick and convenient joint construction with conventional flexible sewage hoses.

BRIEF DESCRIPTION OF THE DRAWINGS

FIG. 2 illustrates an enlarged view of one end of the fitting along lines 2—2 of FIG. 1;

FIG. 3 demonstrates a fitting of the linear type for joining two flexible sewage hoses.

DESCRIPTION OF THE PREFERRED EMBODIMENT

Figure 1:
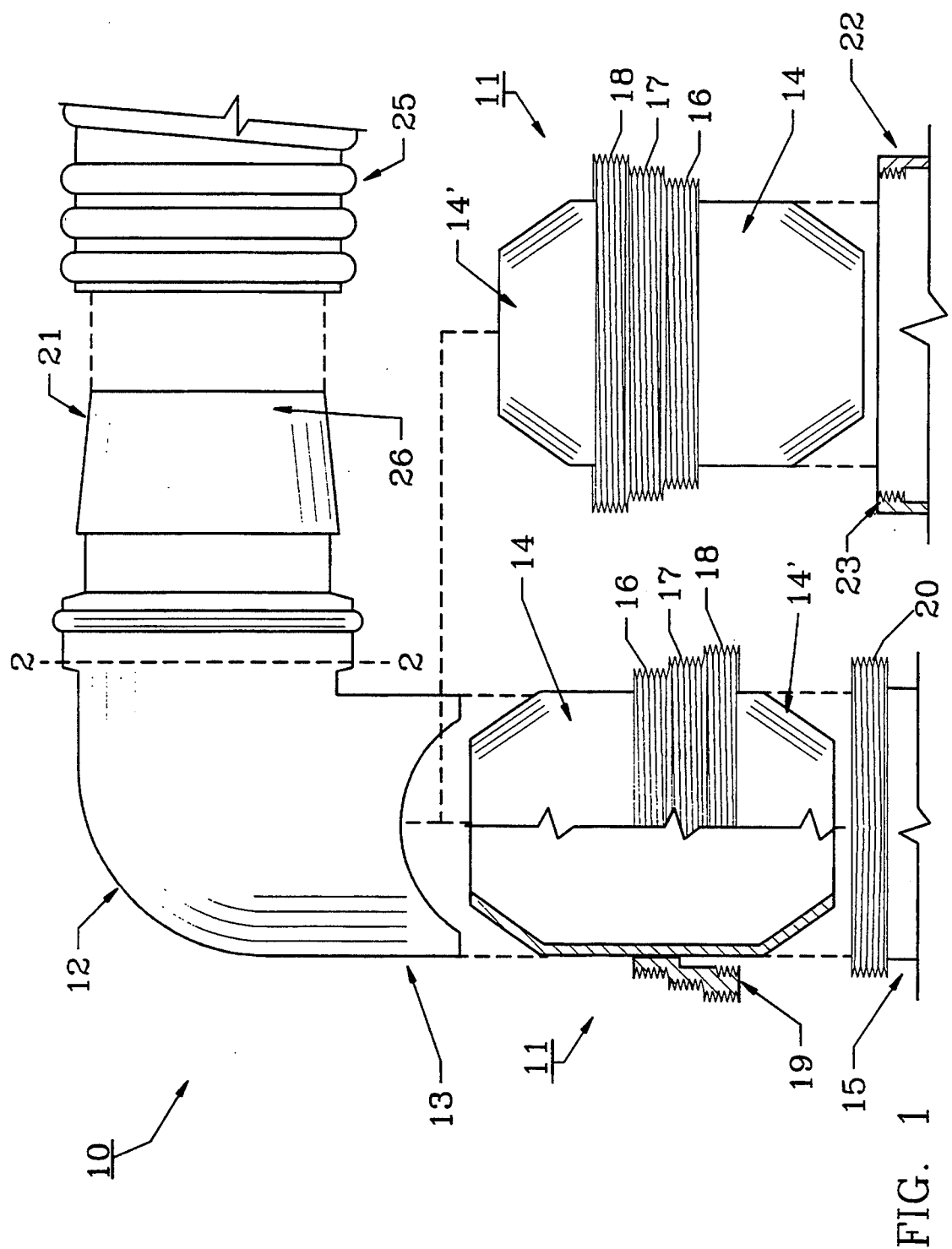
FIG. 1 illustrates a two-piece elbow type connector fitting having a reversible cylindrical section.

The preferred form of the invention is shown in FIG. 1 whereby an elbow connector fitting and ring combination is illustrated having a main cylindrical section with one end for attachment to a flexible sewage hose and the other end at 90° thereto for slidably receiving a reversible cylindrical section having a plurality of threaded sectors positioned on a cylinder. The threaded sectors include three different diameter male threads and a single female threaded sector positioned between the largest, outermost male sector and the cylinder. The flexible hose receiving end of the main cylindrical section includes a ridge which circumscribes a cylinder section and defines a narrow groove for receiving a stretchable ring. Beside the narrow groove on the cylinder a deeper, wider groove is circumscribed. The hose receiving end of the main cylindrical section is conically shaped and has a smooth outer surface to allow the flexible hose to slide thereover into the wide groove where the stretchable ring is directed to hold the flexible hose securely therein.

DETAILED DESCRIPTION OF THE DRAWINGS AND OPERATION OF THE INVENTION

For a better Understanding of the invention, turning now to the drawings, FIG. 1 illustrates a universal two-piece hose fitting 10 having a first cylindrical, section 11 which is slidably joinable to second cylindrical section 12. Cylindrical section 11 is reversible, i.e., either end 14, 14' will slidably unite with second cylindrical section 12 either in an upright or upside down manner as shown. Second cylindrical section 12 has end 13 which slidably engages with first cylindrical section ends 14 and 14′ as ends 14, 14′ are of the same diameter. The inner diameter of end 13 of second cylindrical section 12 is greater than the outer diameter of ends 14, 14′ of first cylindrical section 11 to allow a tight, slidable fit therewith. Sewage stub pipe 15 may for example, have a male threaded end 20 for engagement with female threaded sector 19 of cylindrical section 11. Stub pipe 15 may have an outside diameter of three inches. First cylindrical section 11 may have to be reversed on cylindrical section 12 as sewage facility stub pipe 22 may for example, have a female threaded end 23. Thus, male sector 17 will now threadably join female threaded end 23 with first cylindrical section end 14′ attached to second cylindrical section 12. Fitting 10 may be molded of suitable plastic or machined from metal or otherwise made.

Second cylindrical section 12 is connected to flexible sewage hose 25 as hose 25 is slidable over end 21 of second cylindrical section 12. End 21 includes conical portion 26 as shown in more detail in FIG. 2. End 21 includes smooth conical portion 26, a relatively wide, deep groove 27 and ridge 28 therebeside. Ridge 28 defines a narrow groove 29 having a width "B" which is much less than width "C" of wide groove 27. Also, in FIG. 2 a cross section of ring 30 is shown having a diameter "A". Diameter "A" is greater than width B of groove 29 thereby causing ring 30 to rest in a shallow posture within groove 29 as will be hereinafter further explained. Ring 30 may be made of a synthetic elastomer, rubber or other flexible and stretchable materials. Thus, when flexible sewage hose 25 is slid over conical portion 26, and over groove 27, ring 30 can be easily, manually urged (or rolled) from groove 29 and directed onto sewage hose 25. As ring 30 contracts around hose 25 (see FIG. 3), it forms a tight fit against sewage hose 25, forming a secure joint and preventing the emission of noxious gases, liquids and the like.

In FIG. 3, linear hose connector 35 is shown which comprises a pair of identical conical opposing ends 36, 36′. A central ridge 37 is positioned between ends 36, 36′ and defines a pair of relatively narrow grooves 38, 38′. In addition, second, wider grooves 39, 39′ are shown whereby hose 25′ has been placed over end 36′ and is held in wide groove 39′ by contracted ring 40′. Ring 40 remains within groove 38 having not been dislodged therefrom as sewage hose 25 has not been placed on end 36.

Figure 4:
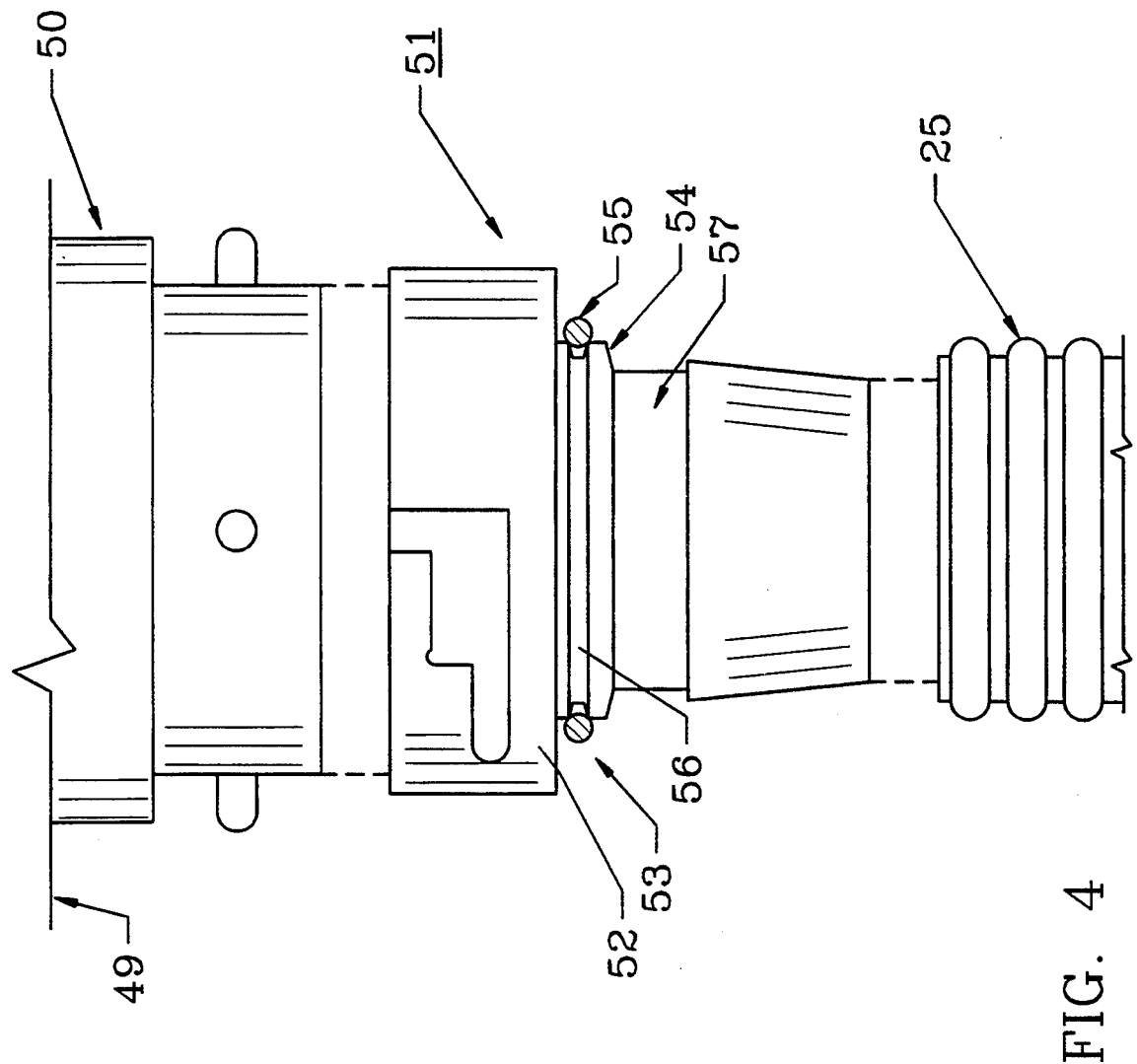
FIG. 4 illustrates a tank connector fitting of the invention.

In FIG. 4 a typical RV sewage tank outlet 50 is shown as may extend below a conventional recreational vehicle for drainage purposes. Tank connector 51 includes a bayonet section 52 and a cylindrical section 53 as hereinbefore described for attachment with flexible sewage hose 25. As seen, cylindrical section 53 includes a ridge 54 which defines a narrow, circumferential groove 56 to provide a rest position for ring 55 (seen cut-away). A wider, deeper groove 57 is seen for accepting flexible sewage hose 25 and as earlier explained, will be held in place by ring 55 which is directed thereover.

Various other fittings and connectors could be constructed and the illustrations and examples provided herein are for explanatory purposes and are not intended to limit the scope of the appended claims.

I claim:

1. A fitting in combination with a ring for connecting to a flexible sewage drain line, the fitting comprising: a cylindrical section, said cylindrical section defining a first circumferential groove, said ring releasably positionable within said first groove, said ring having a cross-sectional diameter which is greater than the top width of said first groove, said cylindrical section defining a second groove, said second groove for receiving a flexible sewage drain line, whereby said ring is easily dislodged from said first groove and directed to said second groove for engagement with said drain line to tightly hold said drain line in said second groove.

2. The combination of claim 1 wherein said ring has a circular cross section.

3. The combination of claim 1 wherein said ring cross-sectional diameter is less than the width of said second groove.

4. The combination of claim 1 wherein said ring comprises an elastic o-ring.

5. The combination of claim 1 wherein said fitting comprises an elbow connector.

6. The combination of claim 1 wherein said fitting comprises a linear connector.

7. The combination of claim I wherein said fitting comprises a tank connector.

8. The combination of claim 1 wherein said cylindrical section comprises a conical portion, said conical portion abutting said second groove.

9. The combination of claim 8 wherein said conical portion has a smooth outside wall.

10. The combination of claim 1 wherein said second groove is deeper and wider than said first groove.

11. A fitting in combination with a ring for connecting to flexible sewage drain line, the fitting comprising: a cylindrical section, said cylindrical section having a conical portion at one end thereof, said cylindrical section defining a narrow first circumferential groove at the other end thereof, said cylindrical section defining a wide second circumferential groove between said first groove and said conical portion, said ring being stretchable and having a circular cross section, said cross section having a diameter greater than the width of said first groove and less than the width of said second groove for snug engagement within said first groove whereby said ring can be easily dislodged from said first groove and be directed to said second groove to tightly hold a sewage drain line therein.

12. The combination of claim 11 wherein said fitting comprises an elbow connector.

13. The combination of claim 11 wherein said fitting comprises a linear connector.

14. The combination of claim 11 wherein said fitting comprises a tank connector.

15. A fitting in combination with a pair of stretchable rings comprising: a hollow, substantially cylindrically shaped member, said cylindrically shaped member comprising a pair of conically shaped ends, a central ridge, said ridge circumscribing said cylindrically shaped member between said ends, said ridge defining a pair of narrow grooves, said cylindrical shaped member defining a pair of wide grooves, one of said wide grooves positioned on each side of said ridge, each of said conically shaped ends abutting one of said wide grooves, each of said pair of rings snugly positionable within one of said narrow grooves for dislodging therefrom and directing to one of said wide grooves whereby a pair of flexible hoses each positioned over one of said conically shaped ends will be held in said wide grooves by said stretchable rings.

16. The combination of claim 15 wherein said cylindrically shaped member is formed from a rigid plastic.

17. The combination of claim 15 wherein said rings are formed from a synthetic elastomer.

18. The combination of claim 15 wherein said narrow grooves have a depth less than the depth of said wide grooves.

19. The combination of claim 15 wherein said narrow grooves are parallel.

20. The combination of claim 15 wherein said narrow grooves circumscribe said ridge.

21. The combination of claim 15 wherein said wide grooves circumscribe said cylindrically shaped member.

22. In a tank connector having a bayonet fitting at one end and a sewage line attachment at the other end, the improvement comprising in combination: means for attachment to a flexible sewage line and a stretchable ring, said attaching means comprising a hollow cylindrical section, said cylindrical section defining a narrow and a wide groove, said ring snugly positionable within said narrow groove for dislodging therefrom and directing to said wide groove whereby said ring will tightly hold a flexible sewage line onto said cylindrically shaped section in said wide groove.

23. The tank connector combination of claim 22 wherein said ring has a circular cross section, the diameter of said ring cross being greater than the width of said narrow groove.

24. The tank connector combination of claim 23 wherein said cross section diameter is less than the width of said wide groove.

25. A universal two piece fitting for connecting a flexible sewage drain line to the input pipe of a sewage system utilizing a stretchable ring, comprising in combination:

a first fitting cylindrical section, a first male threaded sector circumscribing said cylindrical section, a second male threaded sector circumscribing said first cylindrical section, said second male sector extending radially outwardly and longitudinally from said first male sector, a thid male threaded sector circumscribing said cylindrical section, said third male sector extending radially outwardly and longitudinally from said second male sector, a female threaded sector, said female threaded sector extending radially inwardly from said third male sector and radially outwardly from said first cylindrical section, a second fitting cylindrical section, said second cylindrical section slidably uniting with said first fitting cylindrical section, said second cylindrical section defining first and second circumferential grooves, said first fitting cylindrical section for reversible uniting with said second fitting cylindrical section, and a stretchable ring, said ring for snugly positioning within said first groove, for dislodging therefrom and directing to said second groove, whereby a flexible sewage drain line placed on said second cylindrical section over said second circumferential groove can be held in said second circumferential groove by said stretchable ring.

26. The combination of claim 25 wherein said first cylindrical section extends longitudinally beyond said first male threaded sector and beyond said third male threaded sector in opposite directions.

27. The combination of claim 25 wherein said second cylindrical section includes a terminal conical portion, said conical portion positioned proximate said second groove.

28. The combination of claim 25 wherein said second groove is wider than said first groove.

29. The combination of claim 25 wherein said stretchable ring comprises an elastomer.

30. The combination of claim 25 wherein said stretchable ring has a circular cross section.

31. The combination of claim 30 wherein said circular cross section has a diameter greater than the width of said first groove and less than the width of said second groove.

32. A fitting in combination with a ring for connecting to a flexible sewage drain line, the fitting comprising: a cylindrical section, said cylindrical section defining a first circular groove, said ring releasably positionable within said first groove, said cylindrical section defining a second groove, said second groove for receiving a flexible sewage drain line, said second groove deeper and wider than said first groove whereby said ring is easily dislodged from said first groove and directed to said second groove for engagement with said drain line to tightly hold said drain line in said second groove.

* * * * *